United States Patent
Chen et al.

(10) Patent No.: US 8,174,441 B2
(45) Date of Patent: May 8, 2012

(54) CONFIGURABLE CALCULATING CIRCUIT AND RECEIVER HAVING A PLURALITY OF CONFIGURABLE CALCULATING CIRCUITS

(75) Inventors: Chun-Nan Chen, Taipei (TW); Wen-Chieh Tsai, Pingtung County (TW); Kuan-I Li, Kaohsiung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 158 days.

(21) Appl. No.: 12/791,861

(22) Filed: Jun. 1, 2010

(65) Prior Publication Data
US 2011/0291734 A1    Dec. 1, 2011

(51) Int. Cl.
*G01S 19/35* (2010.01)
(52) U.S. Cl. ......... 342/357.75; 342/357.51; 342/357.77; 375/130; 375/136; 375/147; 455/3.02
(58) Field of Classification Search ............ 375/130, 375/136, 137, 140, 142–144, 147, 148, 150, 375/152; 342/352, 357.22, 357.39, 357.51, 342/357.75–357.77; 455/3.02
See application file for complete search history.

(56) References Cited

U.S. PATENT DOCUMENTS

| | | | |
|---|---|---|---|
| 5,504,684 A * | 4/1996 | Lau et al. | 455/3.02 |
| 6,967,992 B1 * | 11/2005 | Rabaeijs et al. | 375/150 |
| 7,061,972 B1 * | 6/2006 | Best | 375/150 |

* cited by examiner

*Primary Examiner* — Patrick O'Neill
(74) *Attorney, Agent, or Firm* — Winston Hsu; Scott Margo

(57) ABSTRACT

A configurable calculating circuit includes a multiplexer, a mixer and an accumulator. The multiplexer is for receiving input signals including at least a first and a second input signals, and selectively outputting at least one of the input signals. The mixer is for mixing a selected input signal outputted from the multiplexer with a local oscillation signal to generate a mixed signal. The accumulator is for accumulating the mixed signal to generate an accumulated signal. When the configurable calculating circuit is operated under a first mode, the multiplexer selects the first input signal, and the accumulator performs a first accumulating operation upon the mixed signal; and when the configurable calculating circuit is operated under a second mode, the multiplexer selects the second input signal, and the accumulator performs a second accumulating operation, different from the first accumulating operation, upon the mixed signal.

4 Claims, 6 Drawing Sheets

CONFIGURABLE CALCULATING CIRCUIT AND RECEIVER HAVING A PLURALITY OF CONFIGURABLE CALCULATING CIRCUITS

BACKGROUND OF THE INVENTION

The present invention relates to a receiver, and more particularly, to a GNSS (Global Navigation Satellite System) receiver having a plurality of configurable calculating circuits.

A conventional GNSS receiver generally includes at least a signal processing unit for removing a carrier of a received satellite signal, spectrum meters for obtaining spectrum information of the received satellite signal, and noise processing units for performing a noise cancellation operation. In addition, generally, the signal processing unit, the spectrum meters and the noise processing units are independent circuits, and each of these circuits includes a multiplexer, an oscillator and an accumulator. In practice, however, not all of the above circuits are in use when receiving the satellite signal most of the time, that is, some of these circuits are at idle states, causing low efficiency of the receiver.

Particularly, in the GNSS receiver supporting GLONASS (GLObal NAvigation Satellite System) standard, because each GLONASS satellite signal has a unique carrier frequency, a plurality of signal process units are required to be built in the receiver for removing the carriers of the received GLONASS satellite signals. Similarly, not all of the signal process units are in use when receiving the satellite signals most of the time, and also causing low efficiency of the receiver.

SUMMARY OF THE INVENTION

It is therefore an objective of the present invention to provide a GNSS receiver having a plurality of configurable calculating circuits, to solve the above-mentioned problems.

According to one embodiment of the present invention, a configurable calculating circuit comprises a multiplexer, a mixer and an accumulator. The multiplexer is utilized for receiving a plurality of input signals including at least a first input signal and a second input signal, and selectively outputting at least one of the input signals. The mixer is coupled to the multiplexer, and is utilized for mixing a selected input signal outputted from the multiplexer with a local oscillation signal to generate a mixed signal. The accumulator is coupled to the mixer, and is utilized for accumulating the mixed signal to generate an accumulated signal. When the configurable calculating circuit is operated under a first mode, the multiplexer selects the first input signal, and the accumulator performs a first accumulating operation upon the mixed signal; and when the configurable calculating circuit is operated under a second mode, the multiplexer selects the second input signal, and the accumulator performs a second accumulating operation, different from the first accumulating operation, upon the mixed signal.

According to another embodiment of the present invention, a configurable calculating circuit comprises a first multiplexer, a mixer, a second multiplexer and an accumulator. The first multiplexer is utilized for receiving a plurality of input signals, and selectively outputting at least one of the input signals. The mixer is coupled to the first multiplexer, and is utilized for mixing a selected input signal outputted from the first multiplexer with a local oscillation signal to generate a mixed signal. The second multiplexer is coupled to the mixer, and is utilized for receiving the mixed signal and an error value, and selectively outputting one of the mixed signal and the error value. The accumulator is coupled to the second multiplexer, and is utilized for accumulating a selected signal outputted from the second multiplexer to generate an accumulated signal, wherein the accumulator further coupled to the first multiplexer, for providing the accumulated signal as an input signal of the first multiplexer.

According to another embodiment of the present invention, a receiver comprises a plurality of configurable calculating circuits and a controller, where each configurable calculating circuit comprises a multiplexer, a mixer and an accumulator. The multiplexer is utilized for receiving a plurality of input signals including at least a first input signal and a second input signal, and selectively outputting one of the input signals. The mixer is coupled to the multiplexer, and is utilized for mixing a selected input signal outputted from the first multiplexer with a local oscillation signal to generate a mixed signal. The accumulator is coupled to the mixer, and is utilized for accumulating the mixed signal to generate an accumulated signal. When the configurable calculating circuit is operated under a first mode, the multiplexer selects the first input signal, and the accumulator performs a first accumulating operation upon the mixed signal; and when the configurable calculating circuit is operated under a second mode, the multiplexer selects the second input signal, and the accumulator performs a second accumulating operation, different from the first accumulating operation, upon the mixed signal. The controller is coupled to the configurable calculating circuits, and is utilized for referring to a signal receiving status of the receiver to control at least a part of the configurable calculating circuits to operate under the first mode and control at least a part of remaining configurable calculating circuits to operate under the second mode.

According to another embodiment of the present invention, a receiver comprises a plurality of configurable calculating circuits and a controller, where each configurable calculating circuit comprises a first multiplexer, a mixer, a second multiplexer and an accumulator. The first multiplexer is utilized for receiving a plurality of input signals, and selectively outputting one of the input signals. The mixer is coupled to the first multiplexer, and is utilized for mixing a selected input signal outputted from the first multiplexer with a local oscillation signal to generate a mixed signal. The second multiplexer is coupled to the mixer, and is utilized for receiving the mixed signal and an error value, and selectively outputting one of the mixed signal and the error value. The accumulator is coupled to the second multiplexer, and is utilized for accumulating a selected signal outputted from the second first multiplexer to generate an accumulated signal. The controller is coupled to the configurable calculating circuits, and is utilized for referring to a signal receiving status of the receiver to control at least a part of the configurable calculating circuits to operate under a first mode and control at least a part of remaining configurable calculating circuits to operate under a second mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
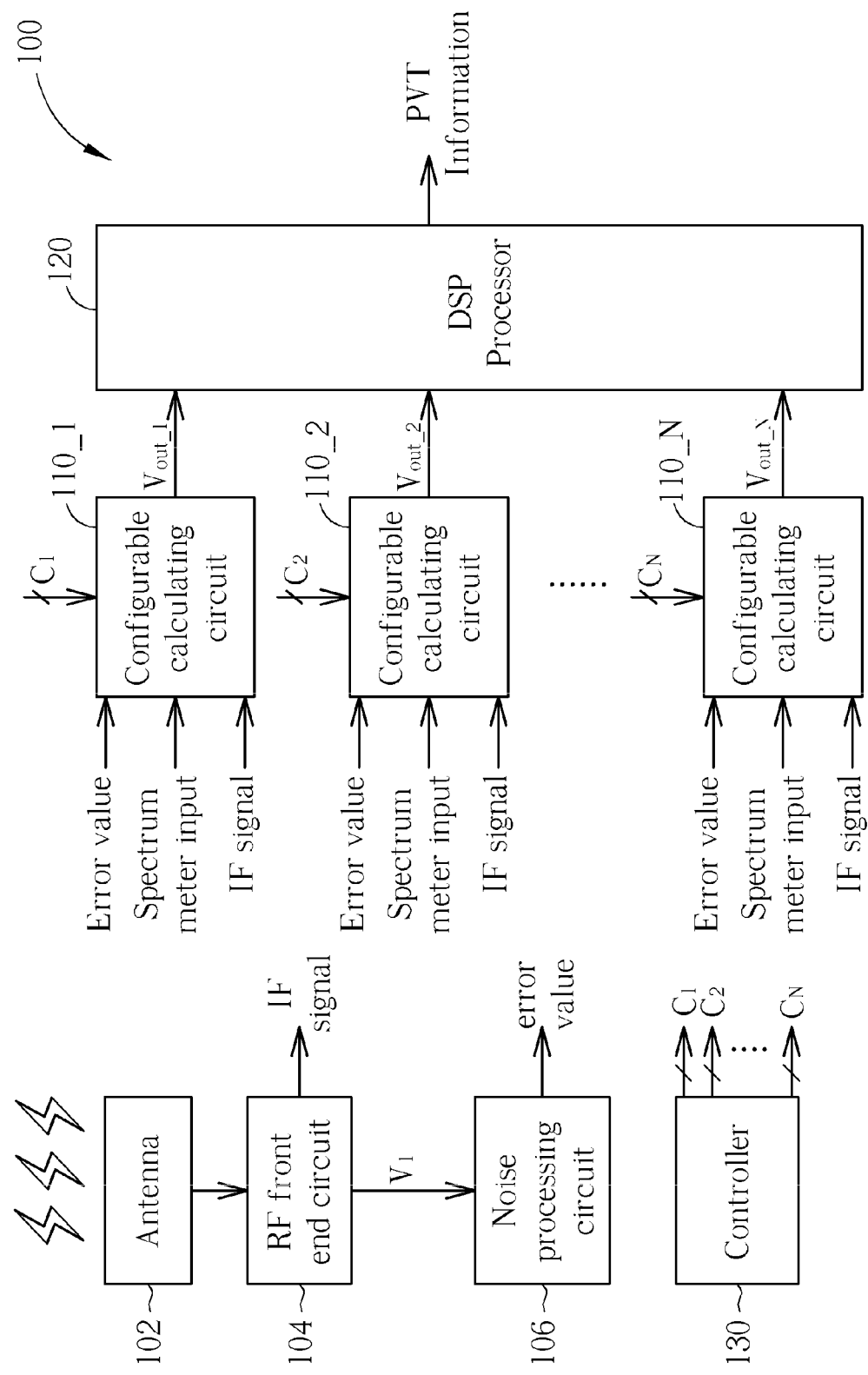
FIG. 1 is a diagram illustrating a receiver according to one embodiment of the present invention.

Please refer to FIG. 1. FIG. 1 is a diagram illustrating a receiver 100 according to one embodiment of the present invention. As shown in FIG. 1, the receiver 100 comprises an antenna 102, an RF (radio frequency) front end circuit 104, a noise processing circuit 106, a plurality of configurable calculating circuits 110_1-110_N, a DSP (digital signal processing) processor 120 and a controller 130. In addition, the receiver 100 can be applied to at least one of the GNSS standards such as GPS (Global Positioning System), GLONASS and Galileo standards.

In the operations of the receiver 100, the antenna 102 receives satellite signals, and the RF front end circuit 104 processes the satellite signals from the antenna 102 to generate an IF signal (intermediate frequency signal). In addition, the noise processing circuit 106 receives an output signal $V_1$ from the RF front end circuit 104 and generates an error value. It is noted that, in practice, the output signal $V_1$ can be the IF signal or any other processed satellite signal which can be used for determining an error value for noise estimation/cancellation operations.

Furthermore, each of the configurable calculating circuits 110_1-110_N is used for receiving the IF signal generated from the RF front end circuit 104, the error value generated from the noise processing circuit 106 and an spectrum meter input, and selectively processing one of these signals (the IF signal, the error value and the spectrum meter input) according to control signals generated from the controller 130. In detail, for example, when the controller 130 generates control signals $C_1$ to control the configurable calculating circuit 110_1 to operate under a first mode, the configurable calculating circuit 110_1 receives the IF signal and performs a carrier removal and a down-sampling operations upon the IF signal to generate an IF-wiped-off data which serves as an output signal $V_{out\_1}$ of the configurable calculating circuit 110_1; when the controller 130 controls the configurable calculating circuit 110_1 to operate under a second mode, the configurable calculating circuit 110_1 receives the spectrum meter input and performs spectrum analysis to output the spectrum information which serves as the output signal $V_{out\_1}$ of the configurable calculating circuit 110_1; and when the controller 130 controls the configurable calculating circuit 110_1 to operate under a third mode, the configurable calculating circuit 110_1 receives the error value and generates a weighted sinusoid for noise cancellation which serves as the output signal Vout_1 of the configurable calculating circuit 110_1.

For simplicity, each of the configurable calculating circuits 110_1-110_N can be worked as an IF removal circuit under the first mode, a spectrum meter under a second mode, or a noise estimation circuit under a third mode according to the control signals generated from the controller 130. In addition, the configurable calculating circuit can also be at an idle state (i.e., not process any signal). That is, output signals $V_{out\_1}$-$V_{out\_N}$ of the configurable calculating circuits 110_1-110_N can be IF-wiped-off data, the spectrum information, the weighted sinusoidal or nothing.

In addition, the spectrum meter input inputted into the configurable calculating circuits 110_1-110_N can be the IF signal generated from the RF front end circuit 104, the IF-wiped-off data outputted from one of the configurable calculating circuits 110_1-110_N, or any other signal which requires to be analyzed to obtain the spectrum information.

Finally, the DSP processor 120 receives at least a part of the output signals from the configurable calculating circuits 110_1-110_N to generate PVT (position, velocity and time) information.

In addition, there are many arrangements for the operations of the configurable calculating circuits 110_1-110_N. For example, a part of the configurable calculating circuits 110_1-110_N can be operated as the IF removal circuits (i.e., under the first mode) to process the satellite signals having one or more standards, and at least a part of the remaining configurable calculating circuits are operated as the spectrum meter (i.e. under the second mode) and/or the noise cancellation circuit (i.e., under the third mode). For another example, the configurable calculating circuit 110_1 is operated as the IF removal circuits (i.e., under the first mode) to process the satellite signal having GPS standard, and the configurable calculating circuits 110_2-110_6 are operated as the IF removal circuits (i.e., under the first mode) to process the satellite signal having GLONASS standard, and the remaining configurable calculating circuits 110_7-110_N are operated under the second mode, third mode or at idle state. In this way, the hardware (i.e. the configurable calculating circuit 110_1-110_N) can be efficiently allocated between IF processing, FDMA de-multiplexing, spectrum analysis and noise cancellation.

Figure 2:
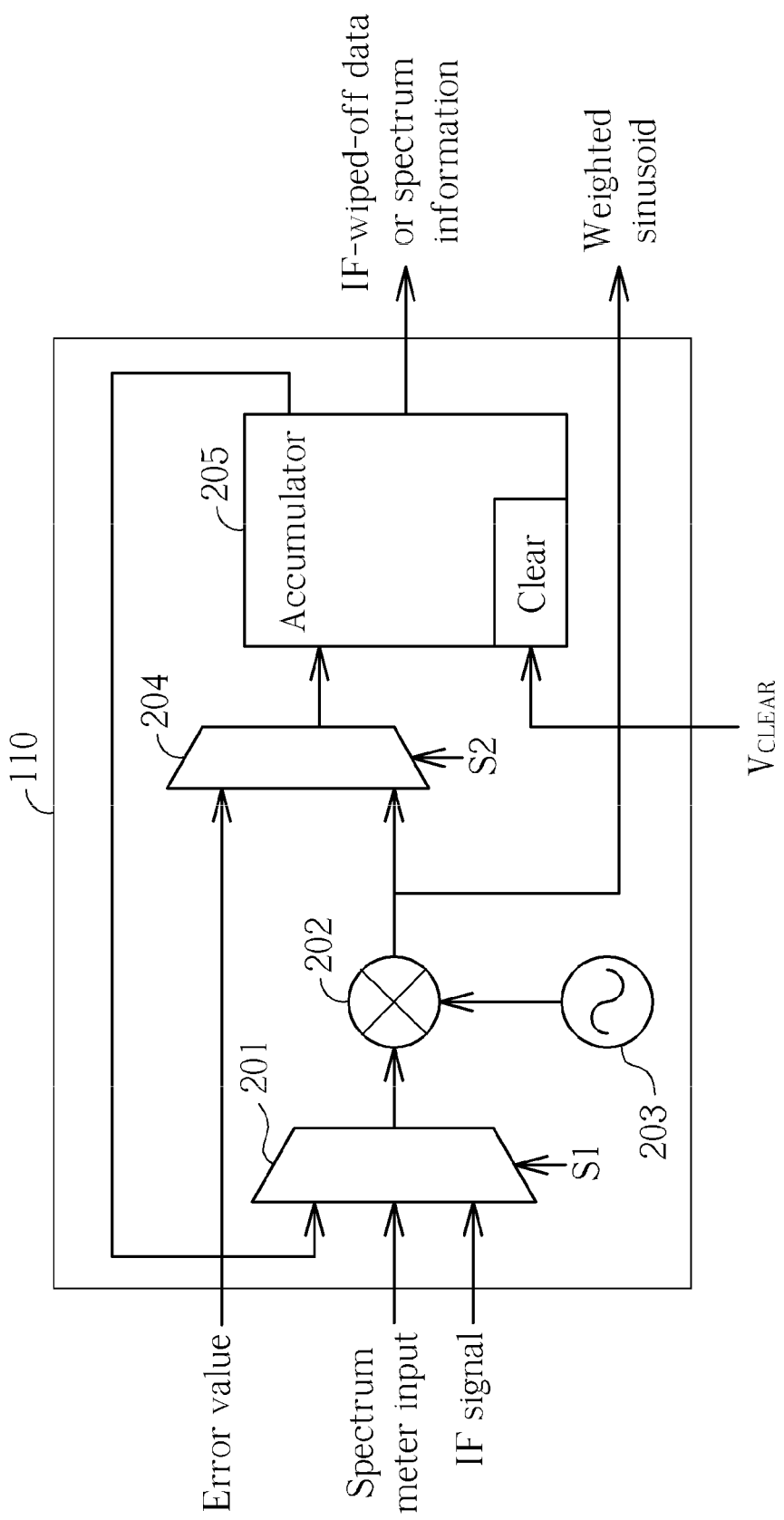
FIG. 2 is a diagram illustrating the configurable calculating circuit shown in FIG. 1 according to one embodiment of the present invention.

Please refer to FIG. 2. FIG. 2 is a diagram illustrating the configurable calculating circuit 110 shown in FIG. 1 according to one embodiment of the present invention. As shown in FIG. 2, the configurable calculating circuit 110 comprises a first multiplexer 201, a mixer 202, an oscillator 203, a second multiplexer 204 and an accumulator 205. The operations of the configurable calculating circuit 110 when operated under the first, second and the third mode are described as follows:

When the configurable calculating circuit 110 is operated under the first mode, the controller 130 generates a first selection signal S1 and a second selection signal S2 which serve as the control signals to the first multiplexer 201 and the second multiplexer 204, respectively, to enable a conductive path between the IF signal and the mixer 202, and to enable a conductive path between the mixer 202 and the accumulator 205. Therefore, the mixer 202 mixes the IF signal with an oscillation signal generated from the oscillator 203 to generate the mixed signal, where the oscillation signal here has a frequency equal to a carrier frequency of the IF signal. For example, the frequency of the oscillation signal may be selected to be 4.092 MHz for a GPS IF signal, 3.069 MHz for a Galileo IF signal, 1602 MHz+n×0.5625 MHz for a Glonass L1 band signal, or 1246 MHz+n×0.4375 MHz for a Glonass L2 band signal, where n is a satellite's frequency channel number (n=−7, −6, −5, . . . , 7). Then, the accumulator 205 performs a down-sampling operation upon the mixed signal to generate an accumulated signal which serves as the IF-wiped-off data, and can be reset by a clear signal $V_{CLEAR}$.

When the configurable calculating circuit 110 is operated under the second mode, the controller 130 generates the first selection signal S1 and the second selection signal S2 which serve as the control signals to the first multiplexer 201 and the second multiplexer 204, respectively, to enable a conductive path between the spectrum meter input and the mixer 202, and to enable the conductive path between the mixer 202 and the accumulator 205. Therefore, the mixer 202 mixes the spectrum meter input with an oscillation signal generated from the oscillator 203 to generate the mixed signal, where the frequency of the oscillation signal here is selected as a target frequency to be analyzed. Then, the accumulator 205 performs an averaging operation upon the mixed signal to by a clear signal $V_{CLEAR}$ generate the accumulated signal which serves as the spectrum information.

When the configurable calculating circuit 110 is operated under the third mode, the controller 130 generates the first selection signal S1 and the second selection signal S2 which serve as the control signals to the first multiplexer 201 and the second multiplexer 204, respectively, to enable a conductive path between the an output of the accumulator 205 and the mixer 202, and to enable a conductive path between the error value and the accumulator 205. Therefore, the accumulator 205 accumulates the error value and generates an accumulated signal to the mixer 202 via the first multiplexer 201, and the mixer 202 mixes the accumulated signal with the oscillation signal generated from the oscillator 203 to generate a mixed signal, i.e., a weighted sinusoidal. This weighted sinusoidal generated from the mixer 202 is further utilized in a noise cancellation operation in the DSP processor 120.

Figure 3:
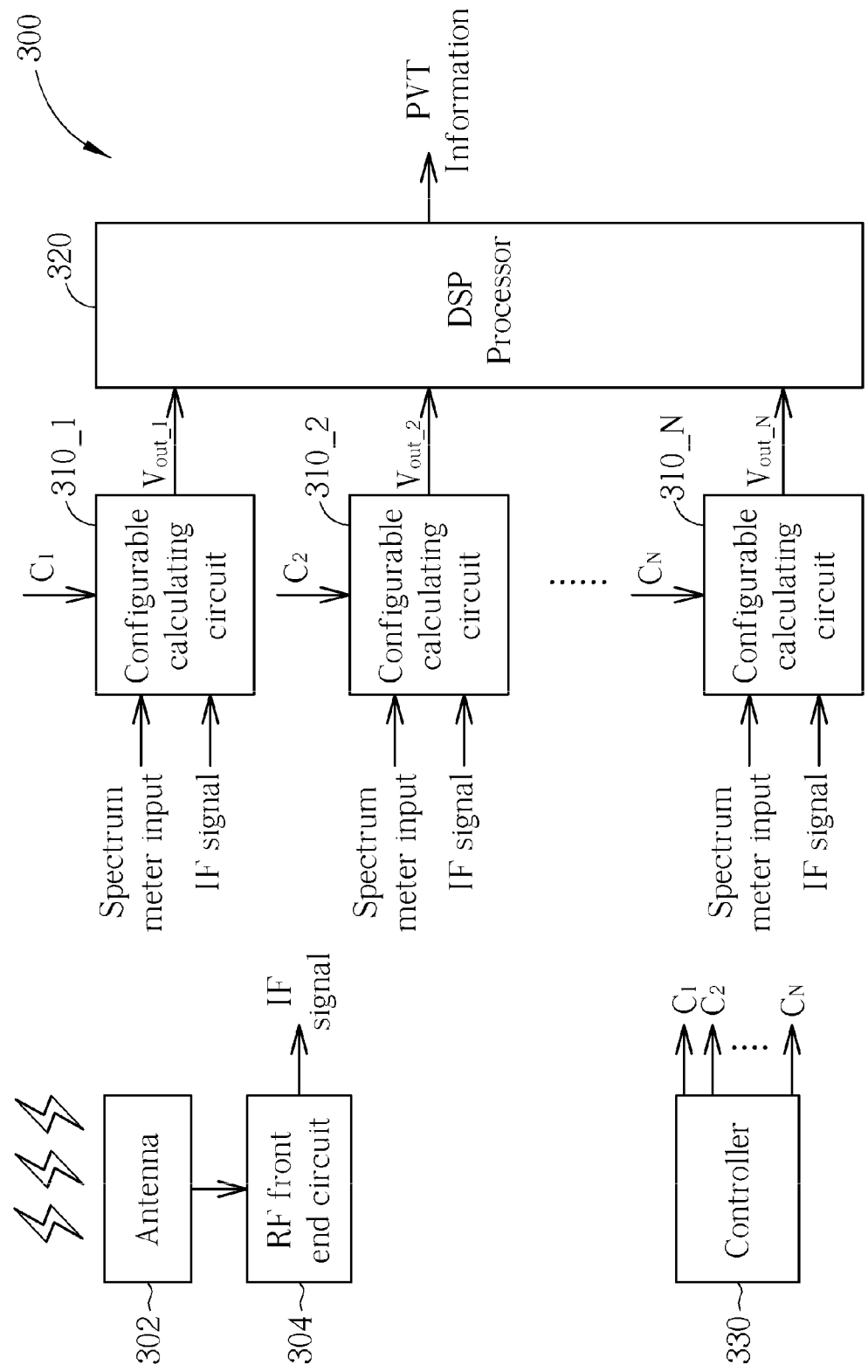
FIG. 3 is a diagram illustrating a receiver according to another embodiment of the present invention.

However, the configurable calculating circuit 110 is not necessarily limited to have all the IF processing, spectrum meter and noise cancellation functionalities. In one embodiment, the configurable calculating circuit 110 may be configured to perform only two functionalities. Please refer to FIG. 3. FIG. 3 is a diagram illustrating a receiver 300 according to another embodiment of the present invention. As shown in FIG. 3, the receiver 300 comprises an antenna 302, an RF front end circuit 304, a plurality of configurable calculating circuits 310_1-310_N, a DSP processor 320 and a controller 330. In addition, the receiver 300 can be applied to at least one of the GNSS standards such as GPS, GLONASS and Galileo standards.

In the operations of the receiver 300, the antenna 302 receives antenna signals, and the RF front end circuit 304 processes the satellite signals from the antenna 302 to generate an IF signal. Then, each of the configurable calculating circuits 310_1-310_N is used for receiving the IF signal generated from the RF front end circuit 304 and an spectrum meter input, and selectively processing one of these two signals (the IF signal and the spectrum meter input) according to a control signal generated from the controller 330.

The operations of the configurable calculating circuits 310_1-310_N are similar to the configurable calculating circuits 110_1-110_N shown in FIG. 1, the difference is that the configurable calculating circuits 310_1-310_N merely have two modes, that is a first mode to operate as an IF removal circuit and a second mode to operate as a spectrum meter. Furthermore, the configurable calculating circuit can also be at an idle state (i.e., not process any signal). In addition, as the operations of the configurable calculating circuits under the first mode and the second mode are described above, further descriptions are therefore omitted here.

Finally, the DSP processor 320 receives at least a part of the output signals from the configurable calculating circuits 310_1-310_N to generate PVT information.

In this way, the hardware (i.e. the configurable calculating circuit 110_1-110_N) can be efficiently allocated between IF processing and spectrum analysis.

Figure 4:
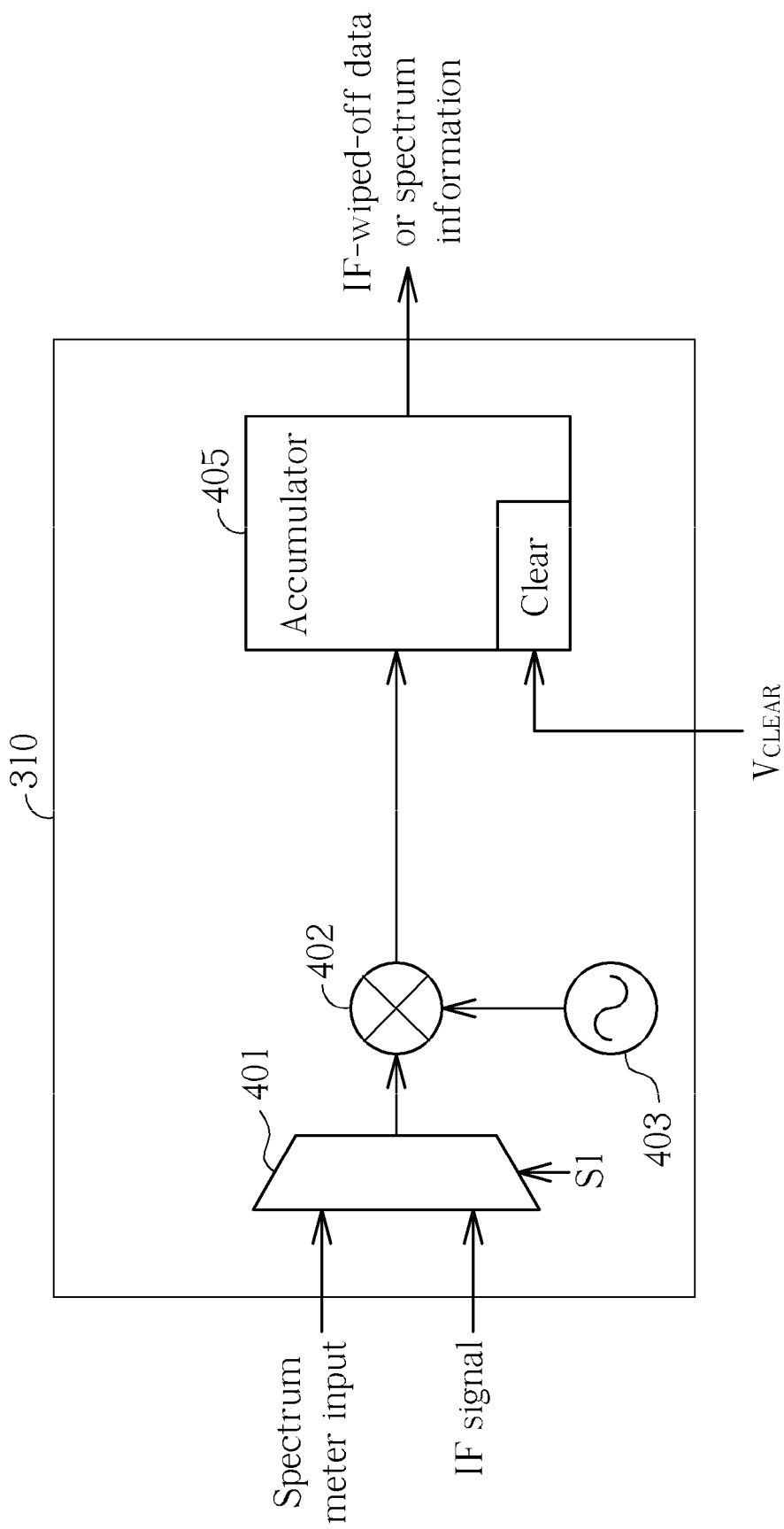
FIG. 4 is a diagram illustrating the configurable calculating circuit shown in FIG. 3 according to one embodiment of the present invention.

Please refer to FIG. 4. FIG. 4 is a diagram illustrating the configurable calculating circuit 310 shown in FIG. 3 according to one embodiment of the present invention. As shown in FIG. 4, the configurable calculating circuit 310 comprises a multiplexer 401, a mixer 402, an oscillator 403 and an accumulator 405. The operations of the configurable calculating circuit 310 when operated under the first and second modes are described as follows:

When the configurable calculating circuit 310 is operated under the first mode, the controller 330 generates a selection signal S1 which serves as the control signal to the multiplexer 401, to enable a conductive path between the IF signal and the mixer 402. Therefore, the mixer 402 mixes the IF signal with an oscillation signal generated from the oscillator 403 to generate the mixed signal, where the oscillation signal here has a frequency equal to a carrier frequency of the IF signal. Then, the accumulator 405 periodically accumulates the mixed signal (i.e., performs a down-sampling operation upon the mixed signal) by a clear signal $V_{CLEAR}$ to generate an accumulated signal which serves as the IF-wiped-off data.

When the configurable calculating circuit 410 is operated under the second mode, the controller 330 generates the selection signal S1 which serve as the control signal to the multiplexer 401, to enable a conductive path between the spectrum meter input and the mixer 402. Therefore, the mixer 402 mixes the spectrum meter input with an oscillation signal generated from the oscillator 403 to generate the mixed signal, where the oscillation signal here has a frequency similar to a frequency required to obtain its spectrum information. Then, the accumulator 405 performs an averaging operation upon the mixed signal to by a clear signal $V_{CLEAR}$ generate the accumulated signal which serves as the spectrum information.

Figure 5:
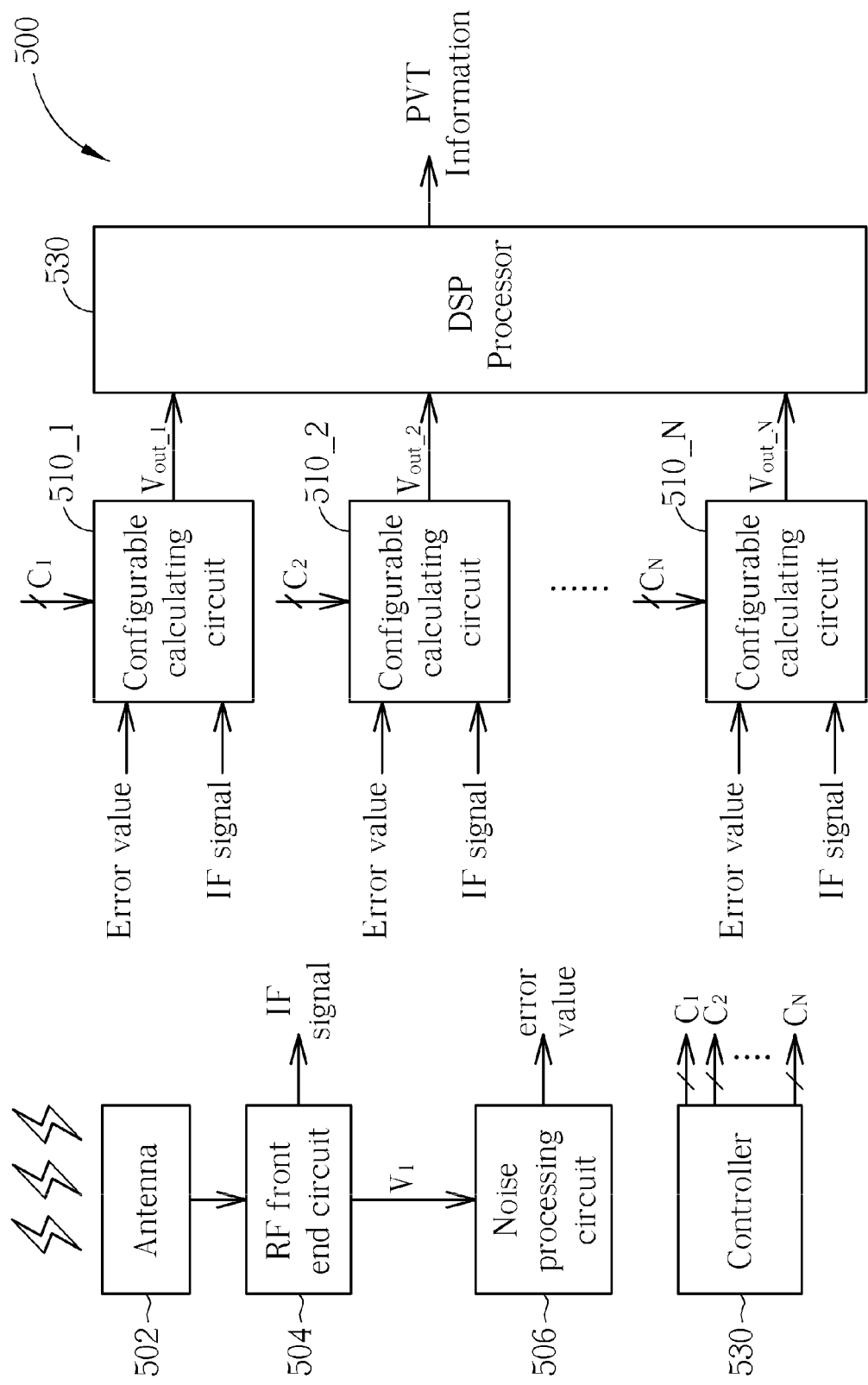
FIG. 5 is a diagram illustrating a receiver according to another embodiment of the present invention.

Please refer to FIG. 5. FIG. 5 is a diagram illustrating a receiver 500 according to one embodiment of the present invention. As shown in FIG. 5, the receiver 500 comprises an antenna 502, an RF front end circuit 504, a noise processing circuit 506, a plurality of configurable calculating circuits 510_1-510_N, a DSP processor 520 and a controller 530. In addition, the receiver 500 can be applied to at least one of the GNSS standards such as GPS, GLONASS and Galileo standards.

In the operations of the receiver 500, the antenna 502 receives antenna signals, and the RF front end circuit 504 processes the satellite signals from the antenna 502 to generate an IF signal. In addition, the noise processing circuit 506 receives an output signal $V_1$ from the RF front end circuit 504 and generates an error value. It is noted that, in practice, the output signal $V_1$ can be the IF signal or any other processed satellite signal which can be used for determining an error value for noise cancellation operations.

In addition, each of the configurable calculating circuits 510_1-510_N is used for receiving the IF signal generated from the RF front end circuit 504 and the error value generated from the noise processing circuit 506, and selectively processing one of these two signals (the IF signal and the error value) according to control signals generated from the controller 530. The operations of the configurable calculating circuits 510_1-510_N are similar to the configurable calculating circuits 110_1-110_N shown in FIG. 1, the difference is that the configurable calculating circuits 510_1-510_N merely have two modes, that is a first mode to operate as an IF removal circuit and a second mode to operate as a noise cancellation circuit. Furthermore, the configurable calculating circuit can also be at an idle state (i.e., not process any signal). In addition, as the operations of the configurable calculating circuits under these two modes are described above, further descriptions are therefore omitted here.

Finally, the DSP processor 520 receives at least a part of the output signals from the configurable calculating circuits 510_1-510_N to generate PVT information.

Figure 6:
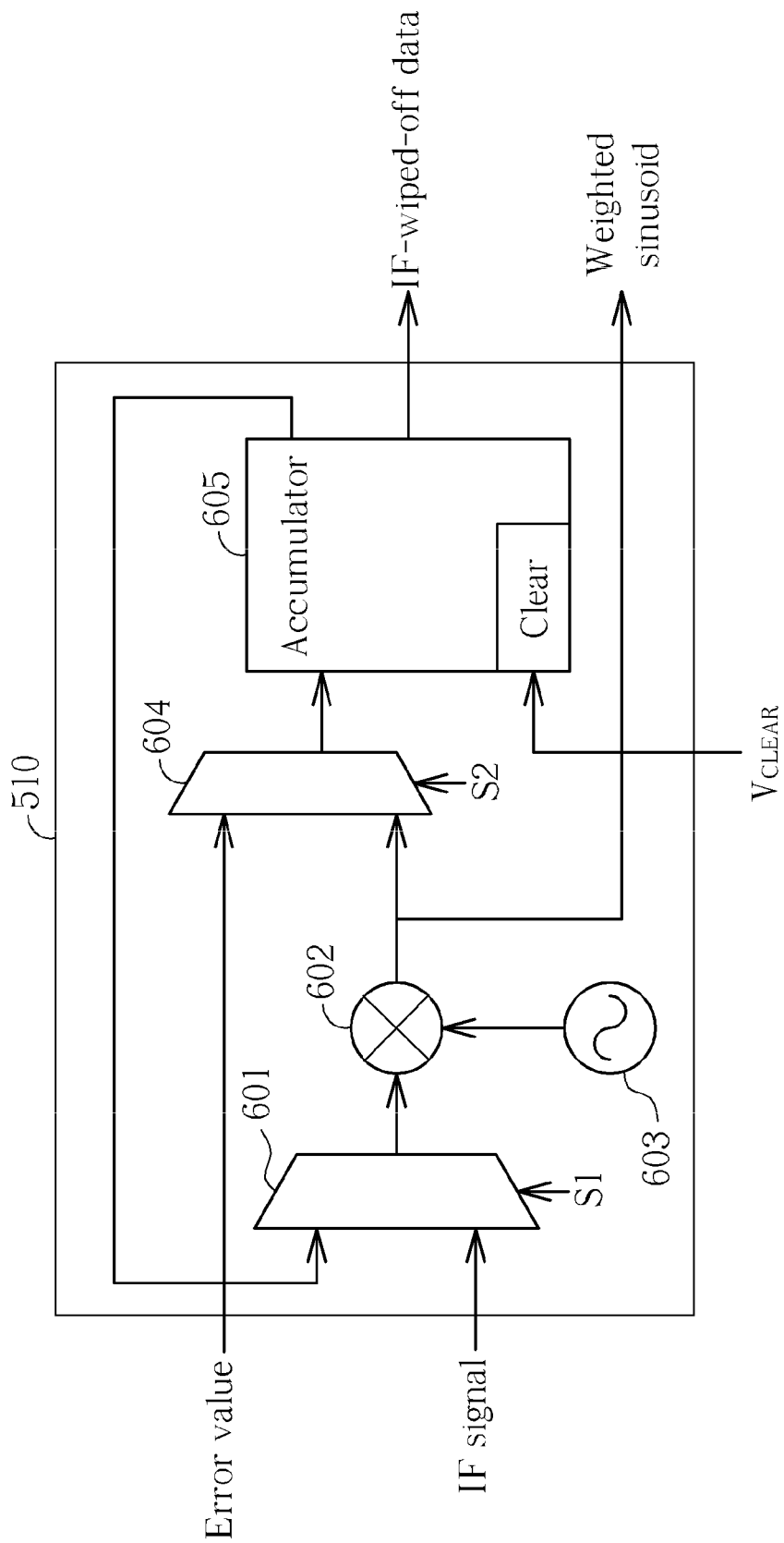
FIG. 6 is a diagram illustrating the configurable calculating circuit shown in FIG. 5 according to one embodiment of the present invention.

Please refer to FIG. 6. FIG. 6 is a diagram illustrating the configurable calculating circuit 510 shown in FIG. 5 according to one embodiment of the present invention. As shown in FIG. 6, the configurable calculating circuit 510 comprises a first multiplexer 601, a mixer 602, an oscillator 603, a second multiplexer 604 and an accumulator 605. The operations of the configurable calculating circuit 510 when operated under the first, second mode are described as follows:

When the configurable calculating circuit 510 is operated under the first mode, the controller 530 generates a first selection signal S1 and a second selection signal S2 which serve as the control signals to the first multiplexer 601 and the second multiplexer 604, respectively, to enable a conductive path between the IF signal and the mixer 602, and to enable a conductive path between the mixer 602 and the accumulator 605. Therefore, the mixer 602 mixes the IF signal with an oscillation signal generated from the oscillator 603 to generate the mixed signal, where the oscillation signal here has a frequency equal to a carrier frequency of the IF signal. Then, the accumulator 605 periodically accumulates the mixed signal (i.e., performs a down-sampling operation upon the mixed signal) by a clear signal $V_{CLEAR}$ to generate an accumulated signal which serves as the IF-wiped-off data.

When the configurable calculating circuit 510 is operated under the second mode, the controller 530 generates the first selection signal S1 and the second selection signal S2 which serve as the control signals to the first multiplexer 601 and the second multiplexer 604, respectively, to enable a conductive path between the an output of the accumulator 605 and the mixer 602, and to enable a conductive path between the error value and the accumulator 605. Therefore, the accumulator 605 accumulates the error value and generates an accumulated signal to the mixer 602 via the first multiplexer 601, and the mixer 602 mixes the accumulated signal with the oscillation signal generated from the oscillator 603 to generate a mixed signal, i.e., a weighted sinusoidal. This weighted sinusoidal generated from the mixer 602 is further utilized in a noise cancellation operation in the DSP processor 520.

Briefly summarized, in the receiver of the present invention, a plurality of configurable calculating circuits are dynamically operated to have different functions. Therefore, the hardware of the receiver can be more efficient in use.

Those skilled in the art will readily observe that numerous modifications and alterations of the device and method may be made while retaining the teachings of the invention.

What is claimed is:

1. A configurable calculating circuit, comprising:
   a multiplexer, for receiving a plurality of input signals including at least a first input signal and a second input signal, and selectively outputting at least one of the input signals;
   a mixer, coupled to the multiplexer, for mixing a selected input signal outputted from the multiplexer with a local oscillation signal to generate a mixed signal; and
   an accumulator, coupled to the mixer, for accumulating the mixed signal to generate an accumulated signal;
   wherein when the configurable calculating circuit is operated under a first mode, the multiplexer selects the first input signal, and the accumulator performs a first accumulating operation upon the mixed signal; and when the configurable calculating circuit is operated under a second mode, the multiplexer selects the second input signal, and the accumulator performs a second accumulating operation, different from the first accumulating operation, upon the mixed signal.

2. The configurable calculating circuit of claim 1, wherein when the configurable calculating circuit is operated under the first mode, the mixer mixes the first input signal with the local oscillation signal to remove a carrier of the first input signal to generate the mixed signal, and the accumulator performs a down-sampling operation upon the mixed signal to generate the accumulated signal.

3. The configurable calculating circuit of claim 2, wherein when the configurable calculating circuit is operated under the second mode, the mixer mixes the second input signal with the local oscillation signal to generate the mixed signal, and the accumulator performs an averaging operation upon the mixed signal to generate the accumulated signal.

4. The configurable calculating circuit of claim 1, wherein when the configurable calculating circuit is operated under the second mode, the mixer mixes the second input signal with the local oscillation signal to generate the mixed signal, and the accumulator performs an averaging operation upon the mixed signal to generate the accumulated signal.

* * * * *